(No Model.) 2 Sheets—Sheet 1.
H. F. PARSHALL & J. W. DARLEY, Jr.
CONTROLLER FOR ELECTRIC MOTORS.

No. 539,293. Patented May 14, 1895.

WITNESSES
John W. Gibboney
Benjamin B. Hull

INVENTORS
Horace F. Parshall
John W. Darley Jr.
by Bentley & Blodgett
Attys (No Model.) 2 Sheets—Sheet 2.

H. F. PARSHALL & J. W. DARLEY, Jr.
CONTROLLER FOR ELECTRIC MOTORS.

No. 539,293. Patented May 14, 1895.

WITNESSES
John H. Gibboney
Benjamin B. Hull

INVENTORS
Horace F. Parshall
John W. Darley Jr.
by Bentley & Blodgett
Attys

UNITED STATES PATENT OFFICE.

HORACE F. PARSHALL AND JOHN W. DARLEY, JR., OF LYNN, MASSACHUSETTS, ASSIGNORS TO THE GENERAL ELECTRIC COMPANY, OF NEW YORK.

CONTROLLER FOR ELECTRIC MOTORS.

SPECIFICATION forming part of Letters Patent No. 539,293, dated May 14, 1895.

Application filed February 11, 1893. Serial No. 461,957. (No model.)

*To all whom it may concern:*

Be it known that we, HORACE F. PARSHALL and JOHN W. DARLEY, Jr., citizens of the United States, residing at Lynn, county of Essex, State of Massachusetts, have invented a certain new and useful Improvement in Controlling Electric Motors, of which the following is a specification.

This invention relates to devices for controlling electric motors, especially when used for the propulsion of vehicles, and its object is to get rid of the gearing, universal joints, chains, &c., which must be employed when the controller cylinder is operated manually from the platform of the car. In the present arrangement the rotation or movement of the controller cylinder is accomplished electrically, one or more conductors being brought from the controlling mechanism beneath the car body to a simple and specially constructed switch located upon the platform of the car, or other suitable points, said switch governing electromotive-devices beneath the car which are adapted to move the controlling cylinder in a direction to accelerate or diminish the speed of the car, or to stop or start the same.

Figures 1, 2:
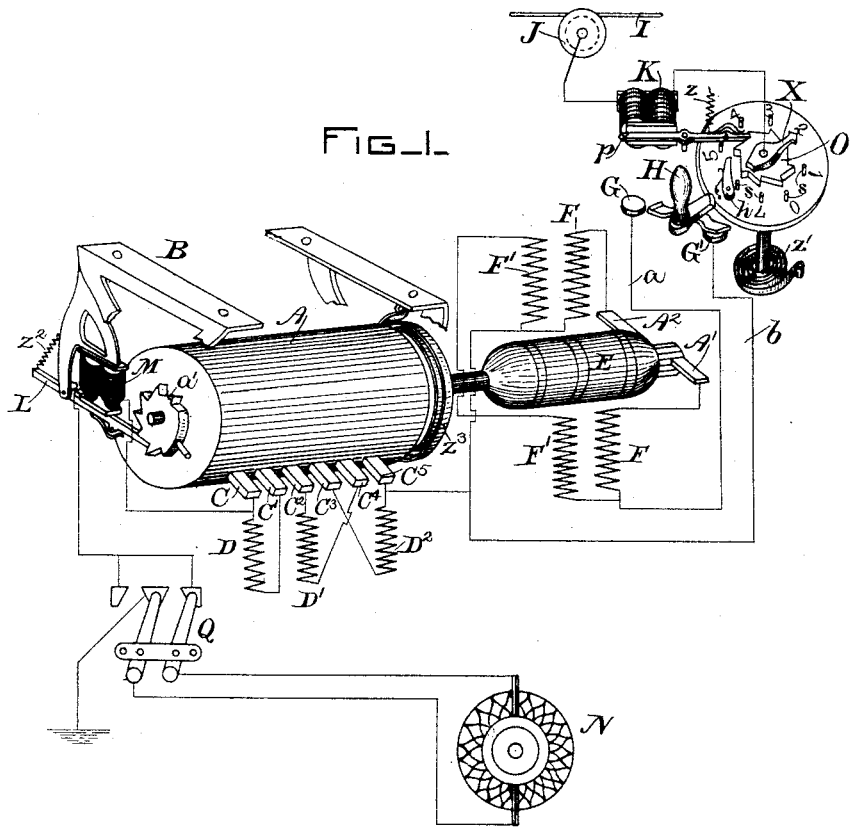
Figure 3:
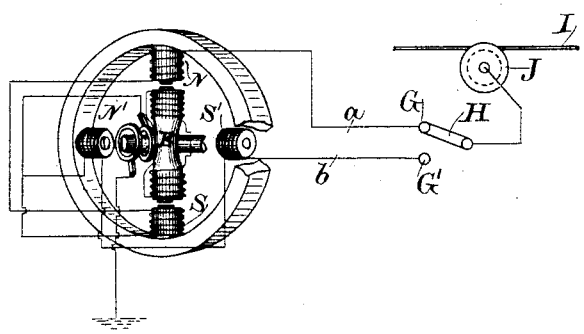
Figure 4:
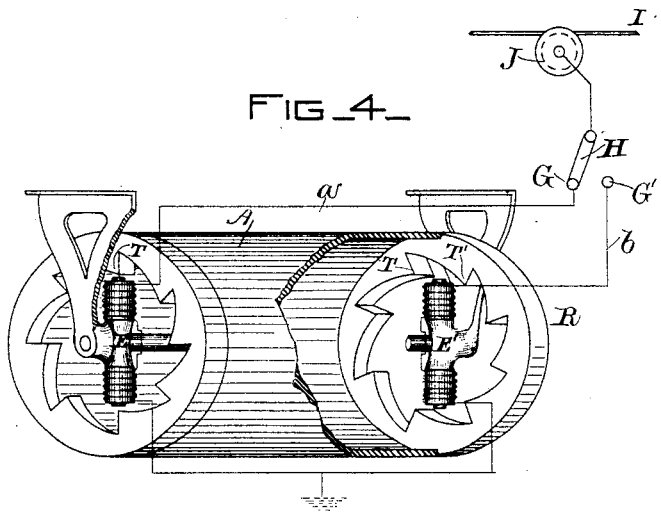

In the accompanying drawings, Figure 1 is a diagrammatic representation of the apparatus and circuit connections. Fig. 2 is a projection of the surface of the controller cylinder, and Figs. 3 and 4 show modifications of the means for actuating the cylinder.

The controller cylinder A is suitably journaled in bearings supported from the truck frame B or the car body, as desired. The cylinder carries a number of contact plates $a$, upon which bear the brushes C, C', C², C³, C⁴, C⁵, which are the terminals of the several sections D, D', D², of the coils wound upon the field magnets of the car motor. These sections are intended to be included in circuit in various combinations so as to vary the magnetic field and therefore the counterelectromotive force of the armature revolving therein correspondingly for any given speed. The exact sequence of connections to be accomplished by the rotation of the controller A form no essential part of the present invention, and while the change of counterelectro-motive force in the revolving armature is shown as made by varying the field magnet strength, it is to be understood that the invention is applicable to those methods of control in which two or more motors are employed and in which such motors are arranged in series or in parallel while connected to a constant potential current supply source, or in which, if desired, rheostats may be introduced at certain times to limit the current, or in which the field magnetism of one or both motors may be varied to change the speed of the car, the invention relating more particularly to the means for controlling the movement of the cylinder A which may, of course, be constructed to give any desired series of connections.

The movement of the cylinder is accomplished by electro-motive devices as follows: An electric motor whose armature is seen at E, and field coils at F, F' is connected to the cylinder or drum A to propel it. The winding F of the motor, of coarse wire and relatively few turns, is in series with the winding of the armature E, and the winding F' of many turns of fine wire is connected in shunt around the armature and coils F, and is wound in reverse direction so as to produce an opposing magnetizing force to that produced by the current in the coils F. Two conductors $a, b$ lead from contact plates G, G' of the platform switch to the brush C⁵, the conductor $a$ including in its circuit the field coils and armature of the motor for propelling the cylinder A, while the conductor $b$ passes to the brush C⁵ directly. It may now be seen that when the switch handle H rests upon the contact G' current will pass from the line I by the trolley J, magnet K, and the conductor $b$ to the cylinder A, and that there is no tendency to movement of such cylinder. If the switch be now moved laterally so as to make contact with plate G, current will pass to conductor $d$ through the windings of the motor. At first most of the current passes through coil F, brush A', armature E, brush A² and coil F and the armature is put into rapid motion. The field coils F', F', which, as stated, are wound to give an opposing magnetism to that of the coils F, F, are not at first strongly energized because of their great inductive resistance, but they soon reach full strength and tend to rotate the armature A in the opposite direction, so that the armature is brought to rest; or the coils F' may even be made stronger than the coils F at full strength so that when the rotation due to F has moved the cylinder A a distance amply sufficient to bring the required contact plates $a$ under the brushes C, C', &c., the armature will rotate backward until stopped by the pawl L engaging with the ratchet wheel $a'$ at the end of the cylinder A, the pawl being held in position by the magnet M which is in series with the car motor N. By this means a definite movement can be given to the cylinder A, although the proportioning of the windings F' and F can also be made such as will give this definite movement even though the potential of the current taken from the overhead line varies somewhat, as it will on different parts of a railway circuit.

The exact position of the drum A with relation to the brushes C C', &c., bearing thereon may be indicated by a suitable index X located upon the platform of the car near the switch and moved by the pawl $h$ carried on the under side of the handle H and engaging with the ratchet wheel O, which is affixed to the circular plate carrying the index numbers, when the handle is moved toward the contact plate G; the handle and pointer being in one piece and being shown broken away in order to more clearly illustrate the construction. It will thus be seen that the index plate and the ratchet wheel O revolve together past the two pawls $p$, $h$. When the handle H is moved toward the contact plate G' the pawl $h$ engages with small stops or studs $s$, $s$, lifting it off the ratchet wheel as shown.

The handle is so arranged with reference to the contact plates G, G' that connection is made on one plate before it is broken at the other. To stop the car or cut off the current, the handle H is moved farther to the right, by which movement it is disengaged from both plates G, G'. The magnet K thereby becomes de-energized, the spring $z$ retracts the pawl $p$, and the pawl $h$ being in the position shown, the spring $z'$ brings back the indicator to zero. With the handle H in the "off" position, as mentioned, the magnet M is de-energized and its pawl is thrown off the ratchet wheel $a'$ by the spring $z^2$, and the drum A is now also brought back to its initial or starting position by a spring $z^3$ arranged to be put under tension by the rotation of the cylinder. A reversing switch such as is commonly employed for reversing the direction of rotation of the car motor armature is shown at Q. This switch can be placed in any suitable position and it may be operated manually upon the platform of the car, and placed adjacent to the switch H, or it can, if desired, be placed beneath the car body and operated electrically from the platform, although this is not so desirable an arrangement.

It is to be understood that the invention is not limited to the special construction of motor, as various forms of motor devices may be used to give the step by step movement to the drum A. Thus, as shown in Fig. 3, magnet poles N, S, may be energized by the handle H contacting with plate G and when the handle H is moved to contact plate G' the poles N, S, become de-energized and the current now passes through conductor $b$ to the poles N', S', which continue the motion of the armature E imparted by N, S thus giving that position to the drum A required for any given speed of the car.

Another form of our device is shown in Fig. 4, in which the drum carrying the controlling surface is free to revolve, and has at its ends notched magnetic rings or ratchets R within which are fixed radial armatures E E'. Upon moving the handle H back and forth to make and break contact alternately with the plates G, G', the armatures E E' are correspondingly energized and the teeth of the ratchets are so disposed that when one of the armatures, as E, is nearest the surface of the teeth T, the other, as E', is midway between the teeth T'. In this way the circuit is shifted intermittently through the two armatures and a continuous rotation is imparted to the drum. Of course the controlling surface could be on another drum, controlled directly or through suitable gearing by the motive drum as in the other forms described.

What we claim as new, and desire to secure by Letters Patent, is—

1. The combination, with a controller cylinder for an electric motor, of an electric motor for actuating such cylinder, means for throwing the line current through said motor or interrupting its flow, and means for returning the cylinder to its normal position when the line current is broken, substantially as described.

2. The combination with a controller cylinder for an electric motor, of an electric motor for actuating said cylinder, and means for returning the cylinder to its normal position when the line current is broken, substantially as described.

3. The combination with a controller cylinder for an electric motor, of an electric motor for actuating said cylinder, a switch for controlling said motor, an index operated by said switch, and means for returning the index to zero when the line current is broken, substantially as set forth.

4. The combination with a controller cylinder for an electric motor, of a ratchet wheel, a pawl engaging said ratchet, a magnet in the line circuit arranged to hold said pawl in operative position, and a spring acting to return the ratchet wheel to its normal position when the line circuit is broken and the magnet releases the pawl, substantially as set forth.

5. The combination with the controller cylinder of an electric motor, of an electric motor for actuating said cylinder, the field coils of said motor being in two sections of different relative resistances, the section having the lower resistance being in series with the armature, and the other section being in shunt therewith, and wound in reverse direction, substantially as set forth.

6. The combination with a controller for an electric car motor located beneath the car body, a step by step motor for actuating said controller, a circuit leading therefrom to the car platform, and a switch on the car platform controlling the step by step motor, substantially as described In witness whereof we have hereto set our hands this 8th day of February, 1893.

HORACE F. PARSHALL.
JOHN W. DARLEY, Jr.

Witnesses:
JOHN W. GIBBONEY,
BENJAMIN B. HULL.